(12) United States Patent
Ritzinger et al.

(10) Patent No.: US 7,348,699 B2
(45) Date of Patent: Mar. 25, 2008

(54) ENCAPSULATED MOTOR

(75) Inventors: Christian Ritzinger, Stuttgart (DE); Martin Engesser, Donaueschingen (DE); Kurt Semma, Dormettingen (DE)

(73) Assignee: Minebeq Co., Ltd., Nagano-ken (JP)

( * ) Notice: Subject to any disclaimer, the term of this patent is extended or adjusted under 35 U.S.C. 154(b) by 392 days.

(21) Appl. No.: 10/499,303

(22) PCT Filed: Dec. 18, 2002

(86) PCT No.: PCT/EP02/14503

§ 371 (c)(1),
(2), (4) Date: Jan. 14, 2005

(87) PCT Pub. No.: WO03/055039

PCT Pub. Date: Jul. 3, 2003

(65) Prior Publication Data
US 2005/0121987 A1   Jun. 9, 2005

(30) Foreign Application Priority Data
Dec. 21, 2001   (DE) ................................ 101 63 321

(51) Int. Cl.
*H02K 5/10* (2006.01)
(52) U.S. Cl. ........................................ 310/86; 310/68 B
(58) Field of Classification Search .............. 310/68 B, 310/104, 85, 86; 324/207.25
See application file for complete search history.

(56) References Cited

U.S. PATENT DOCUMENTS

| 2,866,913 | A | * | 12/1958 | Kronacher | .................. | 310/111 |
| 5,446,966 | A | | 9/1995 | Ishizaki | | |
| 5,562,406 | A | * | 10/1996 | Ooka et al. | .................. | 415/112 |
| 5,696,444 | A | * | 12/1997 | Kipp et al. | ............ | 324/207.23 |
| 5,939,813 | A | * | 8/1999 | Schob | ........................ | 310/254 |
| 6,363,808 | B1 | * | 4/2002 | Wakabayashi et al. | ... | 74/490.03 |
| 6,365,998 | B1 | * | 4/2002 | Kech et al. | .................. | 310/194 |

FOREIGN PATENT DOCUMENTS

| DE | 19845864 | 4/2000 |
| DE | 19924735 | 3/2001 |
| DE | 10130130 | 1/2003 |

(Continued)

OTHER PUBLICATIONS

Peter F. Brosch Moderne Stromrichterantriebe 245-249.

*Primary Examiner*—Dang Le
(74) *Attorney, Agent, or Firm*—Duane Morris LLP

(57) ABSTRACT

A canned motor providing a rotor having a rotor shaft; a can having a cylindrical wall which is closed at one end; and a stator, the cylindrical wall of the can being inserted between the rotor and the stator. To measure the rotational position and, where applicable, the number of revolutions of the rotor, the invention provides a resolver integrated in the canned motor which has a resolver rotor that rotates with the rotor and a stationary resolver stator, the cylindrical wall of the can also lying between the resolver rotor and the resolver stator. The resolver enables the rotational position of the rotor, in particular, to be precisely measured as well as the number of revolutions, and thereby enables the motor to be regulated as basically known from the field of electronically commutated DC motors.

24 Claims, 2 Drawing Sheets

FOREIGN PATENT DOCUMENTS

| | | |
|---|---|---|
| EP | 0281818 | 9/1988 |
| EP | 0713282 | 5/1996 |
| EP | 0758154 | 2/1997 |
| EP | 0846365 | 6/1998 |
| EP | 1024584 | 8/2000 |
| GB | 1102923 | 3/1965 |
| GB | 2289801 | 5/1994 |
| WO | WO0150576 | 7/2001 |

\* cited by examiner

ENCAPSULATED MOTOR

This application claims priority to the filing date of German Patent Application No. 101 63 321.1 filed Dec. 21, 2001, and PCT Application No. PCT/EP02/14503 filed Dec. 18, 2002; the specification of both applications are incorporated herein in their entirety.

FIELD OF THE INVENTION

The invention relates to a canned motor in accordance with the preamble of patent claim 1. Such a canned motor is known for example from EP 0 846 365 B1.

BACKGROUND OF THE INVENTION

To pump aggressive liquids, for example, or water of the highest purity, a complete separation between the drive motor and the pump is required. For such applications, it is known to use a canned motor or gap tube motor which has a tube arranged in the gap between the stator and the rotor. It is also known to suspend the rotor in the gap tube hydrostatically or by means of a sliding bearing. Canned motors have the advantage that the electrical drive side can be hermetically separated by the gap tube or can from the rotating parts and the forwarded medium. Depending on the design of the bearing, the can may be operated for both wet running and dry running. In designing a canned motor it is always important to ensure that the gap tube is sufficiently stable so that the fluid pressure acting on the gap tube does not deform it.

DE 198 45 864 A1 reveals a canned motor having a can that carries the stator windings, the windings resting against the cylindrical outside surface of the can. The can has elements extending outwards around which or within which the windings are wound to create a simply designed canned motor.

EP 1 024 584 A2 relates to a canned motor for a canned centrifugal pump in which two bearings are disposed in the can to journal the shaft. The object of this document is to create a simply designed, easily handled and less expensively fabricated can.

EP 0 846 365 B1 reveals a canned motor having a rotor and a stator as well as a gap tube arranged between the rotor and the stator and at least two bearing apparatuses with at least one of the bearing apparatuses being formed as a bearing and drive apparatus and comprising both an electromagnetic motor drive apparatus and a magnetic bearing apparatus in order to both drive the rotor and to journal it using this bearing and drive apparatus. A sensor to measure the position of the rotor is spatially allocated to the stator in order to measure and regulate the position of the rotor in a radial and axial direction. The rotor position is regulated by means of an active magnetic bearing so that the rotor can rotate freely. The sensor is not capable of or designed to measure the angular position, rotational speed or rotational direction of the rotor.

EP 0 758 154 B1 relates to a canned motor comprising a rotor and a stator and a stator can which is inserted between the rotor and the stator and encloses the rotor. The stator is housed in a stator chamber which is filled with a filler to counteract the expansion of the stator can due to the prevailing fluid pressure in the can. The filler material can be an elastic material or a polymeric material, in particular.

EP 0 713 282 B1 reveals a canned motor for pumps with a can arranged between the rotor and the stator which separates the side carrying the forwarded medium from the electrical drive side, the stator having a sleeve-shaped base body which at least partly rests against the outside surface of the can to ensure that the construction is sufficiently stable even when the can has thin walls.

In the prior art, there are a large variety of construction methods for canned motors which can be realized as brush motors, asynchronous motors with rotary and AC operation or electrically commutated DC motors.

It is an object of the invention to provide a canned motor which can be realized as an electronically commutated DC motor and which has means to precisely measure the rotational position, rotational speed and/or rotational direction of the rotor to ensure that, on the basis of these measured variables, the motor starts up faultlessly in the correct direction and, moreover, to enable the rotational speed and number of revolutions of the motor to be precisely regulated down to very low revolutions.

This object has been solved by a canned motor comprising the features of claim 1.

SUMMARY OF THE INVENTION

The canned motor in accordance with the invention includes a rotor having a rotor shaft; a can with a cylindrical wall which is closed or sealed at one of its ends; and a stator, the cylindrical wall of the can being inserted between the rotor and the stator. To measure the rotational position, the number of revolutions and, where applicable, the rotational direction of the rotor, the invention provides a resolver integrated into the canned motor. The resolver preferably has a resolver rotor that rotates with the rotor and a stationary resolver stator, the cylindrical wall of the can also lying between the resolver rotor and the resolver stator. The resolver enables the rotational position, number of revolutions and rotational speed of the rotor, in particular, to be precisely measured and the motor thereby to be regulated as basically known from the field of electronically commutated DC motors. This kind of regulation which is dependent on the number of revolutions and rotational position is known, for example, from the German Patent Application 101 30 130.8.

Due to the generation of analog sensor signals, the use of resolvers to measure the rotational position, number of revolutions and rotational speed results in a better resolution than when using digital sensors, such as Hall sensors, which have only a limited resolution. A resolver generates three sinus-shaped sensor signals which can be analyzed for the position and rotational direction of the rotor shaft. Due to its design, the resolver has the further advantage that it can support the wall of the can, as explained in more detail below.

The functioning of such sensor systems using resolvers is described, for example, in "*Moderne Stromrichterantriebe*" by Peter F. Brosch, pages 245 to 249. As explained in this document, systems with several sinus signals, two for example, are used in resolvers, with the exciter winding of the resolver being energized and the voltage signals being analyzed via electronics. Resolvers enable the position to be continuously measured. Reference is made to this publication.

To ensure that the canned motor is sufficiently stable, the cylindrical wall is preferably made of metal, particularly of a non-magnetic, poor conductive material such as magnetically non-conductive stainless steel or plastics.

In a preferred embodiment, the canned motor is used as a pump motor and the rotor is formed as a wet running rotor, the can separating the resolver stator and the stator from the conveyed medium. The resolver stator includes transducer and pick-up coils, as shown in the figures and explained below. The can, which is formed from a cylindrical wall having a closed or sealed end, is filled with the conveyed medium, in particular a pressure fluid. The conveyed medium can also be a fluid which is not under pressure and even air, where applicable. It is characteristic of a canned motor that the can is essentially closed, with there being cans that have a closed end wall as well as ones with the end being sealed via a bearing or suchlike.

The canned motor is preferably realized as an inner rotor motor so that the rotor is arranged on the inside of the can and the stator is seated on the outside surface of the cylindrical wall.

An outer rotor motor also lies within the scope of the invention. In respect of the inner rotor motor construction, the resolver rotor is also arranged on the inside of the can and the resolver stator is seated on the outside surface of the cylindrical wall.

In the canned motor of the present invention, the resolver is arranged coaxially at one end of the assembly formed by the rotor and the stator, and the resolver rotor and the resolver stator have narrower outer or inner diameters respectively than the rotor or the stator. The can preferably has a wall thickness of 0.1 mm to 0.5 mm, and in particular of about 0.3 mm.

The resolver rotor of the present invention preferably has a form that is not rotationally symmetrical to the rotational axis of the rotor, such as a polygon shape, and is made from a material that is capable of influencing a magnetic field.

The resolver stator of the present invention preferably has a plurality of stator windings with it being possible, through the interaction of the resolver rotor and resolver stator, to generate signals in respect of the rotational position, number of revolutions and/or the rotational direction of the rotor. In one embodiment of the invention, these stator windings include exciter windings and measuring windings to respectively generate or measure a magnetic field.

Moreover, in accordance with the invention, the resolver is advantageously connected to evaluation electronics that are usually external.

For the purpose of pressure stabilization, the stator and/or the resolver stator of the can may rest closely against the outside surface of the cylindrical wall of the can. In addition, the stator and/or the resolver stator may be molded with a plastic, for example, to stabilize the pressure of the can.

SHORT DESCRIPTION OF DRAWINGS

The invention is described in more detail below on the basis of preferred embodiments with reference to the figures.

DETAILED DESCRIPTION OF PREFERRED EMBODIMENTS

Figure 1:
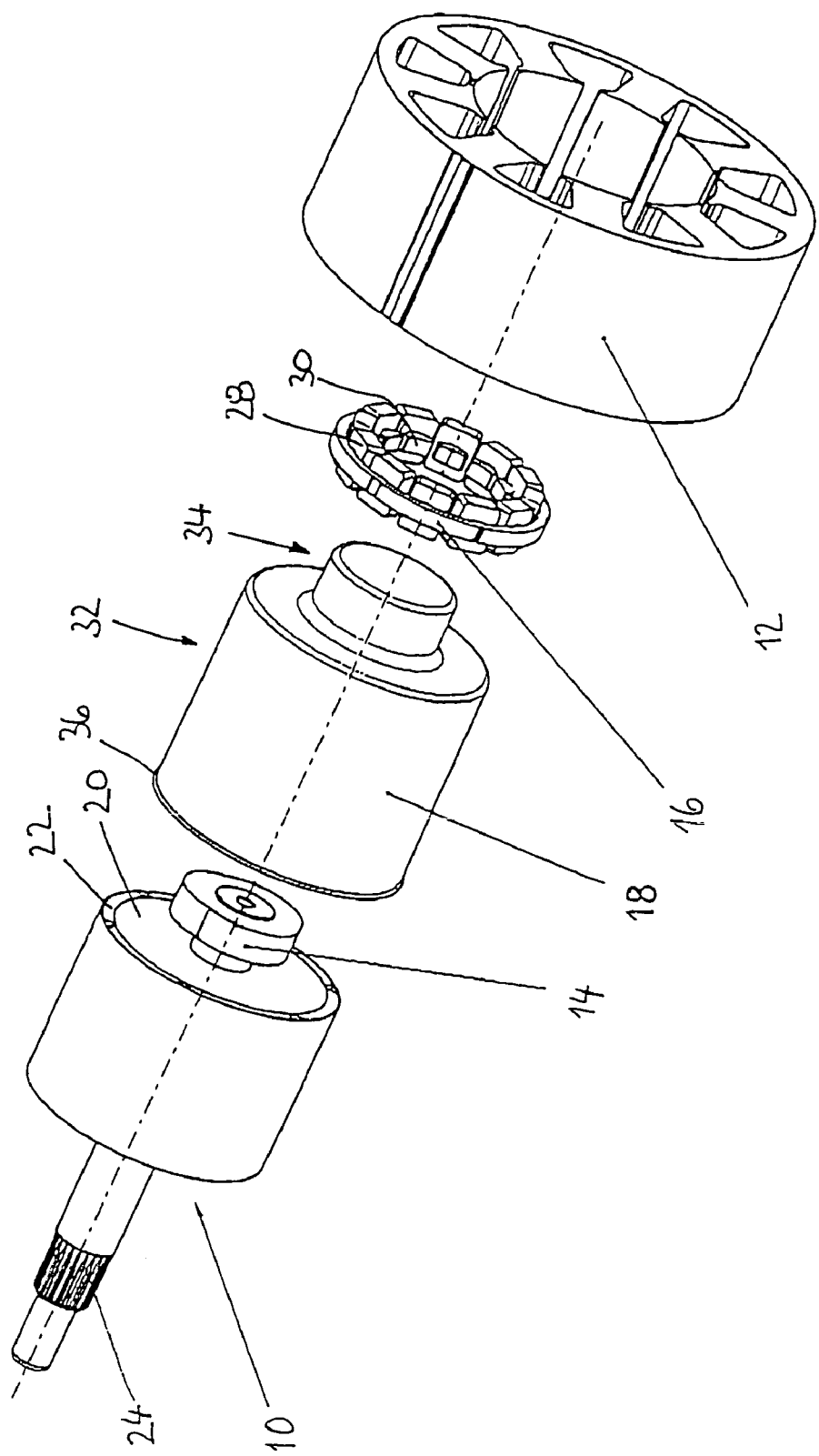
FIG. 1 shows a perspective exploded view of a canned motor in accordance with the invention.

The canned motor in accordance with the invention is preferably used to drive pumps but is not limited to this purpose and is also suited, for example, to drive fans and suchlike, and particularly as a drive apparatus in motor vehicles, such as in a shock absorber system or similar. Generally speaking, the canned motors of the present invention are suitable for use in liquids or in the vicinity of explosive gases etc.

The canned motor according to the invention illustrated in the figure, includes a rotor 10, a stator 12, a resolver having a resolver rotor 14 and a resolver stator 16, and a can 18.

The rotor 10 includes a back iron yoke 20, a permanent magnet 22 and a rotor shaft 24. The stator 12 is shown only schematically by a stator core 26 having nine stator poles, the windings not being shown for the sake of clarity.

Figure 2:
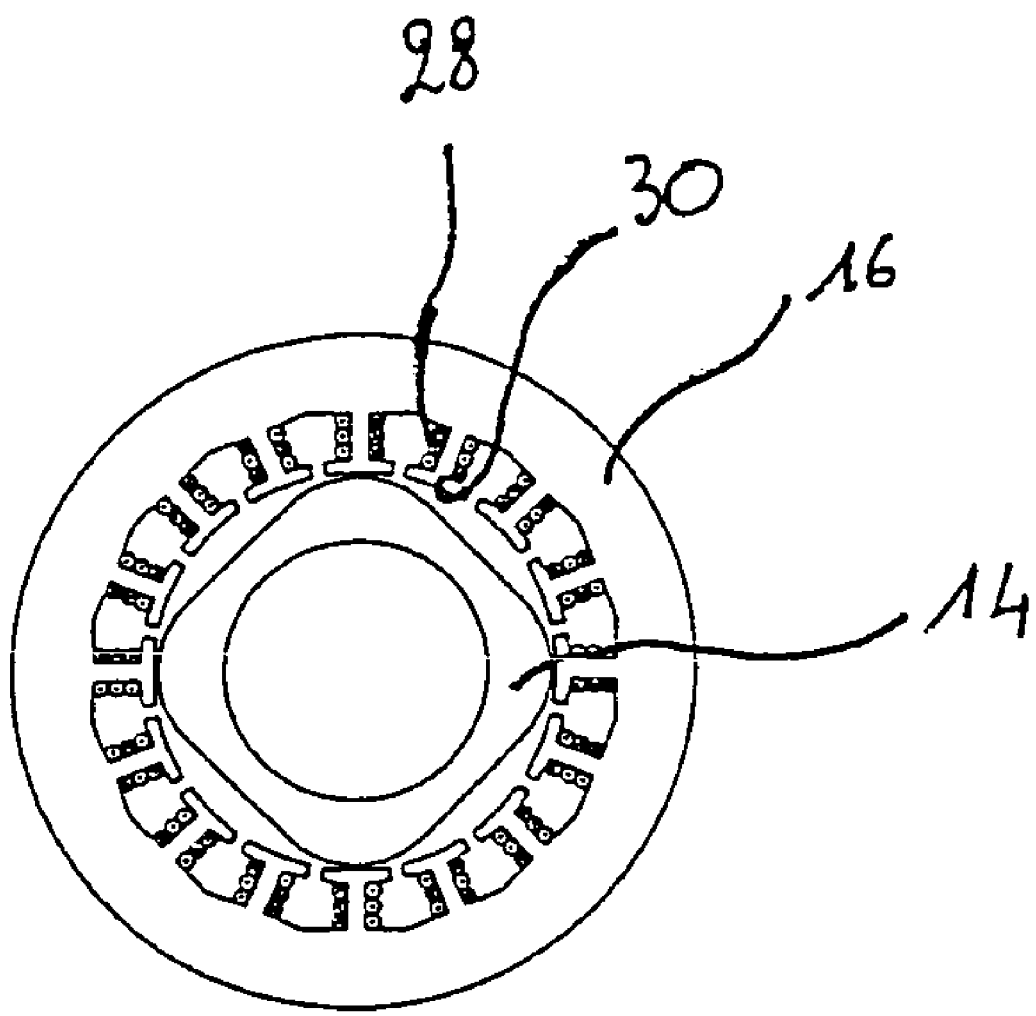
FIG. 2 shows the schematic structure of a resolver which can be inserted into the canned motor illustrated in FIG. 1.

The resolver rotor 14 is seated on one end of the rotor shaft 24 lying opposite to the drive end. The resolver rotor 14 rotates with the rotor 10 and is a component that can change magnetic fields, such as a back iron yoke, a magnet or suchlike. The resolver rotor 14 can be formed as an annular permanent magnet having several magnetic poles, preferably as a polygon, in particular a rectangle or a triangle, or in any other asymmetric shape in such a way that it can change a magnetic field through its rotation, see FIG. 2.

In the embodiment illustrated in the figure, the resolver stator 16 is formed with windings 28 that are seated on the stator poles 30, see also *fig.* 2. The windings 28 include exciter windings and measuring windings which are connected to supply terminals (not illustrated) in order to generate and measure a magnetic field. The field is influenced by the rotational position of the resolver rotor 14 making it possible to measure the rotational position of the rotor 10.

In accordance with a preferred embodiment of the canned motor of the present invention, the resolver is a "variable reluctance resolver" comprising a resolver rotor 14 and a resolver stator 16. A resolver of this kind is illustrated schematically in FIG. 2.

On the resolver stator 16 are arranged both exciter (or "primary") as well as measuring (or "secondary") windings. The resolver rotor 14 has a polygon shape so that the air gap between the resolver rotor 14 and the resolver stator 16 is not constant but is dependent on the angular position in the rotor coordination system. A rotation of the rotor 10 and thus the simultaneously rotating resolver rotor 14 in respect of the resolver stator 16 results in a change in the air gap and thus a change in the coupling between the windings.

By feeding a high-frequency AC voltage into the exciter coil(s) of the "primary circuit", with the rotation of the resolver rotor, an amplitude modulated AC voltage of the same frequency is induced in the measuring coils of the "secondary circuit" whose amplitude depends on the air gap-dependent degree of coupling, that is to say on the position (angular position) of the resolver rotor 14 in respect of the resolver stator 16. In other words, what is involved here is a kind of transformer with changeable coupling between the "primary" and "secondary circuit", with the number of revolutions, rotational direction and rotational position of the resolver rotor 14 and thus of the rotor 10 of the canned motors being analyzed.

The variables relating to the rotor are measured without contact since the resolver rotor 14 and the resolver stator 16 are separated from each other by a concentric space.

The can 18 is formed from a cylindrical wall in two sections 32, 34. The first section 32 is adjusted to the circumference of the permanent magnet 22 of the rotor 10 and the second section 34 is adjusted to the outer circumference of the resolver rotor 14 so that the rotor 10 and the resolver rotor 14 can rotate freely in the can 18 with, however, the smallest possible air gap being formed between the rotor 10 and the stator 12 or the resolver rotor 14 and the resolver stator 16 respectively.

The wall of the can 18 should be as thin as possible and yet sufficiently stable to withstand fluid pressure, in particular the oil pressure within the can. The wall of the can is preferably made of a magnetically non-conductive stainless steel or any other poorly conductive metal so that it is sufficiently stable and has the slightest possible influence on the magnetic fields of the rotors and generates no or the smallest possible eddy current effect. In a preferred embodiment of the invention, the wall thickness lies between 0.1 and 0.5 mm and, in particular, about 0.3 mm. In designing the can 18, care should be taken that the drive and measuring currents of the resolver presented in the invention are about four magnitudes smaller than the drive current of the motor. The choice of material and wall thickness should ensure that even for small measuring currents of a few mA, analyzable measurement signals can still be obtained.

To ensure sufficient mechanical strength with a thin can wall, in a preferred embodiment of the invention, the stator 12 and the resolver stator 16 are formed in such a way that they support the outside wall of the can 18. In addition, the windings of the stator 13 and/or of the resolver stator 16 can be injection molded with a plastic to achieve all-round support.

Tests made on the canned motor of the present invention show that although the wall of the can 18 does have an influence on the measurement of the rotational position and/or the number of revolutions of the rotor using the resolver 14, 16, the influence on the measurement signal is not so large as to prevent a meaningful evaluation of the measurement signal.

In accordance with a preferred embodiment of the invention, the can 18 is slightly bent towards the outside at its free end 36 so that it can be easily slipped over the rotor 10 without damaging it. To seal the can 18, an O-ring, for example, or suchlike can be provided.

The invention that is defined in the following claims can be subjected to a large number of modifications. Thus in the canned motor of the present invention, instead of the described resolver with "variable reluctance" a traditional resolver can also be used whose resolver rotor has several magnetic field control elements and is formed like the permanent magnet of a DC motor, for example, with several magnetic poles. The canned motor in accordance with the invention is preferably realized as an electronically commutated DC motor.

IDENTIFICATION REFERENCE LIST
Rotor 10
Stator 12
Resolver rotor 14
Resolver stator 16
Can 18
Back iron yoke 20
Permanent magnet 22
Rotor shaft 24
Windings 28
Stator poles 30
Wall sections 32, 34
Free can end 36

The invention claimed is:

1. A canned motor comprising a rotor (10) having a rotor shaft (24); a can (18) having a cylindrical wall sealed at one end; a stator (12), the can (18) interposed between the rotor (10) and the stator (12); and a resolver for measuring the rotational position, the rotational speed or the rotational direction of the rotor (10), the resolver having a resolver rotor (14) that rotates with the rotor and a stationary annular resolver stator (16) separated from the resolver rotor (14) by an air gap, wherein the cylindrical wall of the can (18) has a section (34) having a smaller radius which is interposed between the resolver rotor (14) and the resolver stator (16).

2. A canned motor according to claim 1, wherein a portion of the can (18) lies between the resolver rotor (14) and the resolver stator (16).

3. A canned motor according to claim 1, wherein the can 18 is further interposed between resolver rotor (14) and the resolver stator (16).

4. A canned motor according to claim 3, wherein the resolver rotor (14) and the resolver stator (16) have a smaller outer or inner diameters respectively than the rotor (10) or the stator (12).

5. A canned motor according to claim 1, wherein the resolver rotor (14) is arranged coaxially at one end of an assembly formed by the rotor (10) and the stator (12).

6. A canned motor according to claim 1, wherein the resolver rotor (14) is not rotationally symmetrical to the rotational axis of the rotor.

7. A canned motor according to claim 1, wherein the resolver rotor (14) has a polygonal shape.

8. A canned motor according to one of claim 1, wherein the resolver rotor (14) is made of a material capable of influencing a magnetic field.

9. A canned motor according to claim 1, wherein the resolver stator (16) has stator windings (28).

10. A canned motor according to claim 9, wherein the stator windings (28) include at least one of an exciter windings and a measuring windings to respectively generate and measure a magnetic field.

11. A canned motor according to claim 9, wherein a combination of the stator windings (28), the resolver rotor (14) and the resolver stator (16) generate signals indicating at least one of a rotational position, a number of revolutions or a rotational direction of the rotor (10).

12. A canned motor according to claim 1, wherein the stator (12) andlor the resolver stator (16) rest against the cylindrical wall of the can (18).

13. A canned motor according to claim 1, wherein at least one of the stator (12) or the resolver stator (16) is molded with a plastic material.

14. A canned motor according to claim 1, wherein the resolver further comprises at least one evaluation electronics equipment.

15. A canned motor according to claim 1, wherein the cylindrical wall is made of metal.

16. A canned motor according to claim 1, wherein the can (18) further comprises a closed end containing a fluid.

17. A canned motor according to claim 1, wherein the cylindrical wall of the can (18) has a thickness of about 0.1 mm to 0.5 mm.

18. A canned motor according to claim 1, wherein the cylindrical wall of the can (18) is made of a poor conductive metal.

19. A canned motor according to claim 1, wherein the can (18) further comprises an open end which is sealed with an O-ring.

20. A canned motor according to claim 1, wherein the cylindrical wall of the can (18) is outwardly bent at its open end.

21. A canned electric motor comprising:
a rotor (10) coupled to a rotor shaft (24) and a preeminent magnet (14);
a can (18) having a wall section (32), a free end (36) and a closed end (34);
a resolver stator (16); and a stator (12), wherein the resolver rotor (14) rotates axially with rotator shaft (24) to register rotational position of the rotor (10) and wherein the closed end (34) has a smaller radius which is interposed between the resolver rotor (14) and the resolver stator (16).

22. The canned electric motor of claim 21, wherein the resolver stator (16) further comprises a plurality of windings (28) and a plurality of stator poles (30).

23. The canned electric motor of claim 22, wherein the plurality of windings (28) further comprise exciting windings for generating a magnetic field.

24. The canned electric motor of claim 22, wherein the plurality of windings (28) further comprise a measuring windings for measuring the rotational position of the rotor (10).

* * * * *